United States Patent
Grichnik et al.

(10) Patent No.: US 8,073,652 B2
(45) Date of Patent: Dec. 6, 2011

(54) METHOD AND SYSTEM FOR PRE-PROCESSING DATA USING THE MAHALANOBIS DISTANCE (MD)

(75) Inventors: Anthony J. Grichnik, Peoria, IL (US);
Timothy J. Felty, Peoria, IL (US);
James R. Mason, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 477 days.

(21) Appl. No.: 12/216,406

(22) Filed: Jul. 3, 2008

(65) Prior Publication Data

US 2010/0004898 A1  Jan. 7, 2010

(51) Int. Cl.
*G06F 17/18* (2006.01)
(52) U.S. Cl. .................................................. 702/179
(58) Field of Classification Search .................. 702/179, 702/185, 189
See application file for complete search history.

(56) References Cited

U.S. PATENT DOCUMENTS

| | | | |
|---|---|---|---|
| 5,602,938 A | 2/1997 | Akiyama et al. | |
| 5,621,861 A | 4/1997 | Hayashi et al. | |
| 6,502,061 B1 | 12/2002 | Segawa | |
| 6,519,591 B1 * | 2/2003 | Cereghini et al. | 707/737 |
| 6,615,205 B1 | 9/2003 | Cereghini et al. | |
| 7,170,418 B2 | 1/2007 | Rose-Pehrsson et al. | |
| 2003/0099401 A1 | 9/2003 | Driggs et al. | |
| 2004/0064426 A1 | 4/2004 | Depold et al. | |
| 2004/0215424 A1 * | 10/2004 | Taguchi et al. | 702/189 |
| 2006/0229769 A1 * | 10/2006 | Grichnik et al. | 701/1 |
| 2006/0230018 A1 * | 10/2006 | Grichnik et al. | 707/2 |
| 2007/0150471 A1 | 6/2007 | MacGregor | |
| 2007/0203864 A1 | 8/2007 | Grichnik | |
| 2009/0118841 A1 | 5/2009 | Grichnik et al. | |

\* cited by examiner

*Primary Examiner* — Michael Nghiem
(74) *Attorney, Agent, or Firm* — Finnegan, Henderson, Farabow, Garrett & Dunner LLP

(57) ABSTRACT

A computer-implemented method for pre-processing data. The method may include detecting one or more erroneous vectors in a plurality of vectors, detecting one or more erroneous elements in the one or more erroneous vectors, and deleting the detected one or more erroneous elements. The method may also include detecting one or more missing elements in the plurality of vectors. Further, the method may include populating one or more offending vectors that include one or more missing elements and/or deleted erroneous elements with one or more elements that are based on a distance metric.

21 Claims, 6 Drawing Sheets

METHOD AND SYSTEM FOR PRE-PROCESSING DATA USING THE MAHALANOBIS DISTANCE (MD)

TECHNICAL FIELD

This disclosure relates generally to pre-processing data and, more particularly, to a method and system for pre-processing data using the Mahalanobis Distance (MD).

BACKGROUND

Predictive modeling refers to generating a model from a given set of data records of both input parameters and output parameters and predicting actual output parameters corresponding to actual input parameters based on the model. Predictive modeling techniques are often used to build relationships among variables by using data records collected through experimentation, simulation, or physical measurement or other techniques. Predictive models may be built from data by using various methods for many different families of models, such as decision trees, decision lists, linear equations, and neural networks.

The data records used to build a model are known as training data records. In certain situations, the number of data records may be limited by the number of systems that can be used to generate the data records. In these situations, the number of variables may be greater than the number of available data records, which creates so-called sparse data scenarios. In certain other situations, the training data records may be unable to cover the entire input space of the input parameters or the training data records may be discrete such that uniform relationships represented by a single predictive model between input parameters and output parameters may be unavailable across the entire input space and/or output space. In certain further situations, the training data records may include variables with missing or erroneous values.

Techniques exist for determining and discarding variables with missing or erroneous data. For example, U.S. Pat. No. 6,519,591 (the '591 patent) issued on Feb. 11, 2003 to Cereghini et al., discloses a method for performing cluster analysis inside a relational database management system. The method defines a plurality of tables for the storage of data points and Gaussian mixture parameters and executes a series of SQL statements implementing an Expectation-Maximization clustering algorithm. A distance-based clustering approach identifies those regions in which points are close to each other according to some distance function. The squared Mahalanobis distance function is the basis of implementing Expectation-Maximization clustering in SQL. One advantage is that Expectation-Maximization clustering is robust to noisy data and missing information.

However, while the system and method of the '591 patent are useful for implementing a distance-based clustering algorithm, and may be robust to noisy data and missing information, the method of the '591 patent cannot repair abnormal input variables. The method also cannot replace a missing data point in an input variable, thereby increasing the number of input variables that may be used to generate a virtual sensor process model.

The disclosed embodiments are directed to improvements in the existing technology.

SUMMARY

One aspect of the present disclosure includes a computer-implemented method for pre-processing data. The method may include detecting one or more erroneous vectors in a plurality of vectors, detecting one or more erroneous elements in the one or more erroneous vectors, and deleting the detected one or more erroneous elements. The method may also include detecting one or more missing elements in the plurality of vectors. Further, the method may include populating one or more offending vectors that include one or more missing elements and/or deleted erroneous elements with one or more elements that are based on a distance metric.

Another aspect of the present disclosure includes a computer-readable medium for use on a computer system configured to perform pre-processing of data. The computer-readable medium may include computer-executable instructions for performing a method. The method may include detecting one or more erroneous vectors in a plurality of vectors, detecting one or more erroneous elements in the one or more erroneous vectors, and deleting the detected one or more erroneous elements. The method may also include detecting one or more missing elements in the plurality of vectors. The method may further include populating one or more offending vectors that include one or more missing elements and/or deleted erroneous elements with one or more elements that are based on a distance metric.

A further aspect of the present disclosure includes a computer system. The computer system may include a console, at least one input device, and a database configured to store information relevant to a virtual sensor process model. The computer system may also include a processor. The processor may be configured to obtain a set of data records corresponding to a plurality of vectors. The processor may also be configured to detect one or more erroneous vectors in the plurality of vectors, detect one or more erroneous elements in the one or more erroneous vectors, and delete the detected one or more erroneous elements. The processor may further be configured to detect one or more missing elements in the plurality of vectors and populate one or more offending vectors that include missing elements and/or deleted erroneous elements with one or more elements that are based on a Mahalanobis Distance.

DETAILED DESCRIPTION

Figure 1:
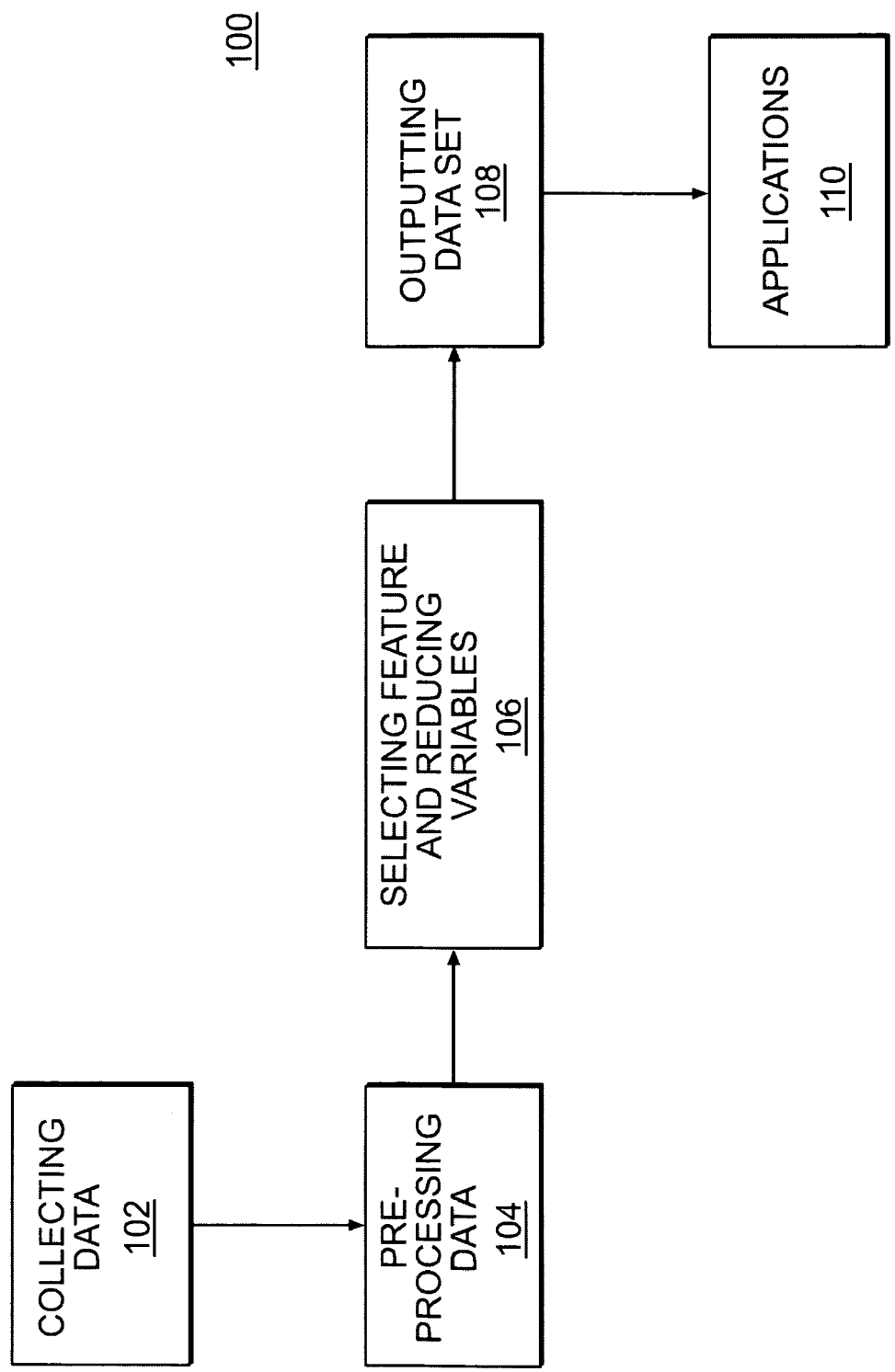
FIG. 1 illustrates a flowchart diagram of an exemplary data analyzing and processing flow consistent with certain disclosed embodiments.

FIG. 1 illustrates a flowchart diagram of an exemplary data analyzing and processing flow 100 using a distance metric, such as the Mahalanobis Distance (MD). FIG. 1 may include steps for pre-processing data sets before the data sets are used for modeling.

The Mahalanobis Distance may refer to a mathematical representation that may be used to measure data profiles based on correlations between variables in a data set. Different patterns may then be identified and analyzed. Mahalanobis Distance differs from Euclidean distance in that Mahalanobis Distance takes into account the correlations of the vector. Mahalanobis Distance of a vector X (e.g., a multivariate vector) may be represented as $$MD_i = (X_i - \mu_x) \Sigma^{-1} (X_i - \mu_x)' \tag{1}$$

where $\mu_x$ is the mean of X and $\Sigma^{-1}$ is an inverse variance-covariance matrix of X. $MD_i$ weights the distance of an element $X_i$ from its mean $\mu_x$ such that observations that are on the same multivariate normal density contour will have the same distance. Such observations may be used to identify and select correlated variables from separate data groups having different variances.

A data set may be composed of several vectors. A vector is a set of related elements, such as a coordinate set on a coordinate plane, all the sensor readings for an engine at a particular time, etc. A vector can be described as a row of a data set. A column of a data set may be described as the same element in all vectors, in other words, as the element occupying the same position in each element. For example, in a data set of a coordinate system composed of elements (X, Y, Z), a vector, or row, may be $(X_1, Y_1, Z_1)$, and a column would be all the Y values in the data set.

As shown in FIG. 1, data records or data sets may first be collected to identify potentially relevant variables (Step 102). Data records may be collected by any appropriate type of method. For example, data records may be taken from actual products, specimens, services, and/or other physical entities. In certain embodiments, a sparse data scenario may arise. That is, the number of data records may be fewer than the number of potential relevant variables. Data records may then be pre-processed to remove or correct obvious erroneous data records and/or populate missing data records (Step 104) in the data set.

The pre-processed data may be provided to certain algorithms, such as a Mahalanobis Distance algorithm, to reduce a large number of potential variables to a desired subset of variables (Step 106). The reduced subset of variables may then be used to create accurate data models. The subset of variables may further be outputted to a data storage for later retrieval (Step 108). The subset of variables may also be directly outputted to other application software programs to further analyze and/or model the data set (Step 110). Application software programs may include any appropriate type of data processing software program. The processes explained above may be performed by one or more computer systems.

One type of model that may utilize the data set may be a virtual sensor. A virtual sensor, as used herein, may refer to a mathematical algorithm or model that produces output measures comparable to a physical sensor based on inputs from other systems, such as physical sensors. For example, a physical $NO_x$ emission sensor may measure the $NO_x$ emission level of a machine and provide values of $NO_x$ emission level to other components, such as an electronic control module (ECM). On the other hand, a virtual $NO_x$ emission sensor may provide calculated values of $NO_x$ emission level to an ECM based on other measured or calculated parameters, such as compression ratios, turbocharger efficiency, aftercooler characteristics, temperature values, pressure values, ambient conditions, fuel rates, engine speeds, etc. The term "virtual sensor" may be used interchangeably with "virtual sensor model." A model type may refer to mathematical characteristics of a virtual sensor model. For example, a virtual sensor model type may include a decision tree model, a linear model, a nonlinear regression model, a linear multiple regression model, a time-lag model, and a neural network model.

Figure 2:
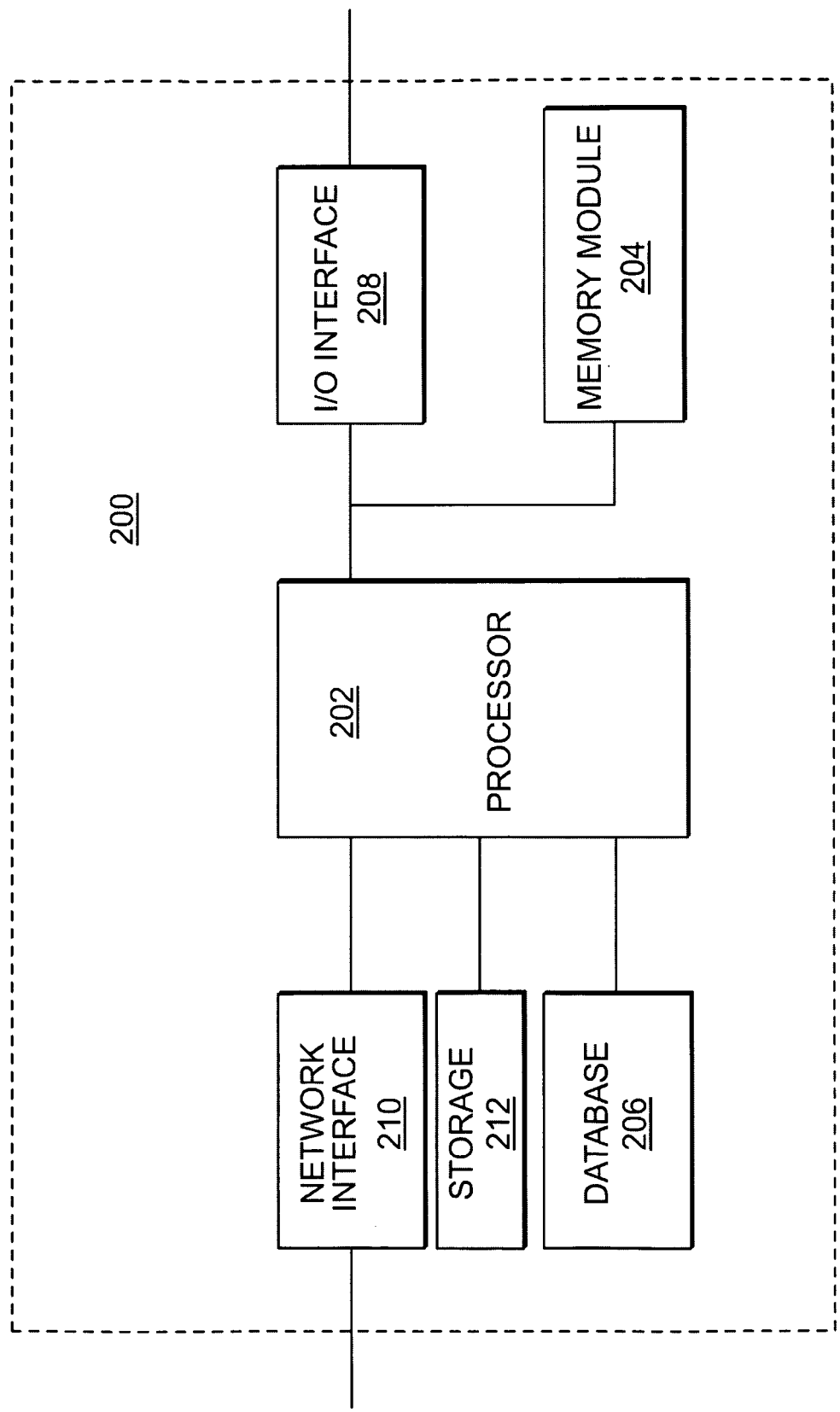
FIG. 2 illustrates a logical block diagram of an exemplary computer system consistent with certain disclosed embodiments.

As shown in FIG. 2, computer system 200, which may implement an exemplary data analyzing and processing flow 100, may include a processor 202, a memory module 204, a database 206, an I/O interface 208, a network interface 210, and a storage 212. Other components, however, may also be included in computer system 200. It is understood that the type and number of listed devices are exemplary only and not intended to be limiting. The number of listed devices may be varied and other devices may be added.

Processor 202 may include any appropriate type of general purpose microprocessor, digital signal processor, or microcontroller. Processor 202 may execute sequences of computer program instructions to perform various processes as explained above. The computer program instructions may be loaded into memory module 204 for execution by processor 202 from a read-only memory (ROM), or from storage 212.

Memory module 204 may include one or more memory devices including, but not limited to, a ROM, a flash memory, a dynamic RAM, and/or a static RAM. Memory module 204 may be configured to store information used by processor 202. Database 206 may include any type of appropriate database containing information on characteristics of measured parameters, sensing parameters, mathematical models, and/or any other control information.

Further, I/O interface 208 may also be configured to obtain data from various sensors or other components and/or to transmit data to these components and to other computer systems or devices. Network interface 210 may include any appropriate type of network device capable of communicating with other computer systems based on one or more wired or wireless communication protocols. Storage 212 may include any appropriate type of mass storage provided to store any type of information that processor 202 may use to operate. For example, storage 212 may include one or more hard disk devices, optical disk devices, or other storage devices to provide storage space. Any or all of the components of computer system 200 may be implemented or integrated into an application specific integrated circuit (ASIC) or field programmable gate array (FPGA) device.

Figure 3:
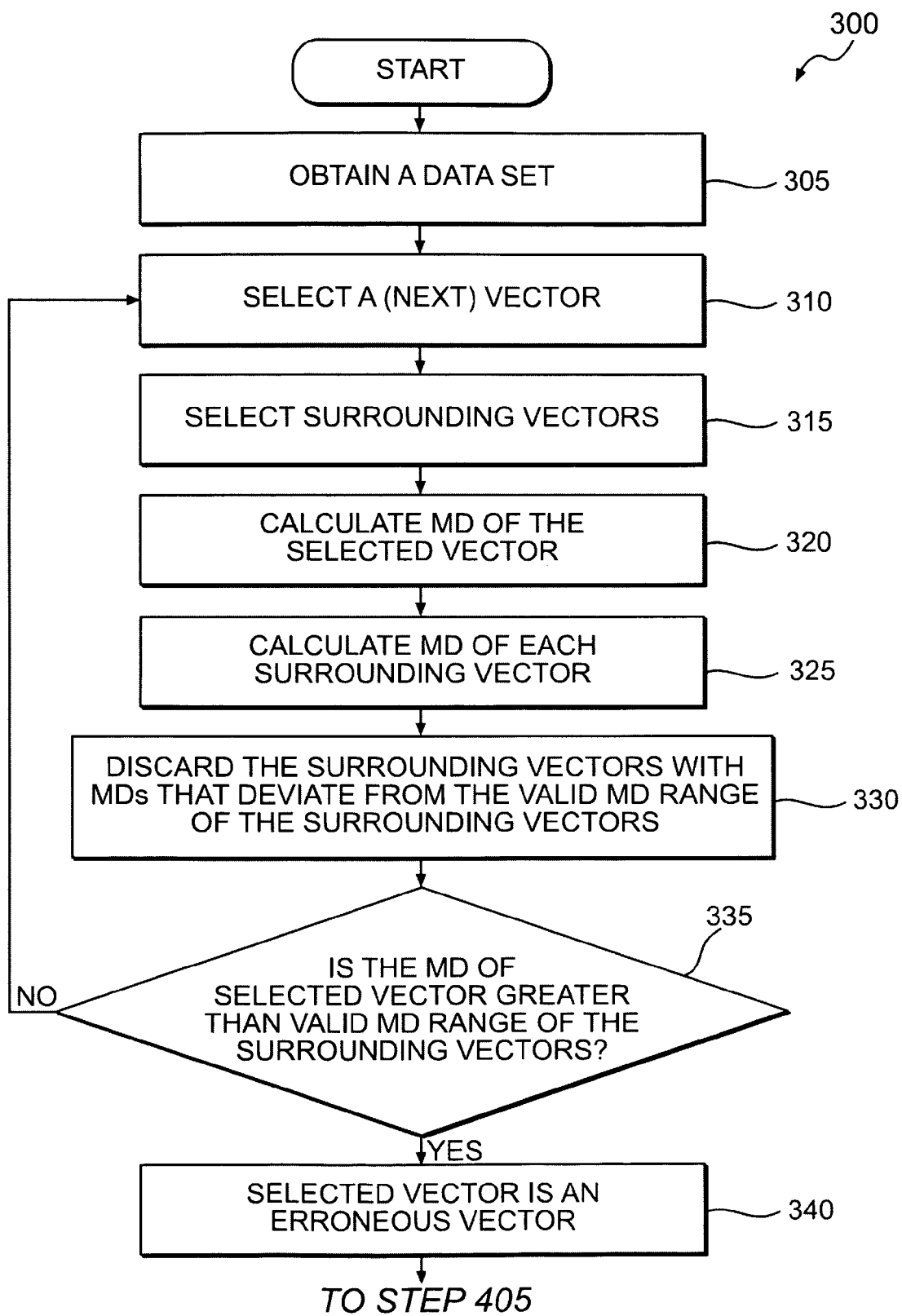
FIG. 3 illustrates a flowchart diagram of an exemplary process for the detection of erroneous vectors in a data set consistent with certain disclosed embodiments.

As explained above, computer system 200 may perform process 104 to pre-process data. In certain embodiments, computer system 200 may use a distance metric, such as the Mahalanobis Distance, in performing some of the steps of process 104. FIG. 3 shows an exemplary flowchart of one part of the process for pre-processing data included in process 104 that may be performed by computer system 200 and more specifically by processor 202 of computer system 200.

FIG. 3 illustrates a flowchart 300 of an exemplary process for the detection of erroneous vectors in a data set consistent with certain disclosed embodiments. The process of FIG. 3 may be performed by computer system 200. For example, computer system 200 may execute one or more software programs that may perform one or more of the process steps of FIG. 3.

In step 305, computer system 200 may obtain a data set corresponding to a set of vectors. The data set may include data records pre-processed by other software programs. Alternatively, computer system 200 may obtain the data set directly from other software programs. The data set may be stored in memory module 204, database 206, and/or storage 212.

In step 310, after obtaining the data set, computer system 200 may select a vector to determine if the vector contains any erroneous elements. If step 310 has already been performed one or more times, computer system 200 may select a vector not previously selected, but for which the MD was determined in a later step. The selected vector may be stored in a table in memory module 204 or database 206.

In step 315, after selecting a vector, computer system 200 may select several surrounding vectors in time. A surrounding vector is a vector close in time to a selected vector. A surrounding vector may have a comparable MD value as the selected vector. In a data set sorted by time order, the surrounding vectors may be those vectors close in the data set to the selected vector. In one exemplary embodiment, the number of surrounding vectors selected may be one or two. In other exemplary embodiments, the number of surrounding vector could be hundreds or thousands. The number of selected surrounding vectors may be based on predetermined criteria, based on analysis of the data set, or based on a run-time analysis. The selected surrounding vectors may be stored in a table in memory module 204 or database 206.

In step 320, after selecting the surrounding vector, computer system 200 may calculate the MD for the selected vector of step 310. In some exemplary embodiments, if the selected vector was a surrounding vector in a previous iteration of the process of flowchart 300, the MD value of the selected vector may have already been calculated in a previous step 325 (described below) as a surrounding vector, and the MD value for that vector may be reused. The MD of the selected vector may be stored in a table in memory module 204 or database 206.

In step 325, after calculating the MD of the selected vector, computer system 200 may calculate the MD of each selected surrounding vector of step 315. In some exemplary embodiments, the MD value of one or more of the surrounding vectors may have been already calculated in a previous step 325 as a surrounding vector, and the MD value for that vector may be reused. In further exemplary embodiments, if in a previous step 330 (to be described below) the MD values for a surrounding vector were discarded, those MD values may not be used again as part of the surrounding vectors. The MD of the selected surrounding vectors may be stored in a table in memory module 204 or database 206.

In step 330, after calculating the MD for each selected surrounding vector, computer system 200 may discard the surrounding vectors with MDs that deviate from the valid MD range of the surrounding vectors. The discarded vector is only discarded for purposes of use as a surrounding vector in the processes in flowcharts 300 and 400. In one exemplary embodiment, the valid MD range may be determined from the surrounding vectors by, for example, the average or mean MD for the vectors in the selected surrounding vectors. In another exemplary embodiment, the valid MD range may have been determined during training and optimizing of a virtual sensor model or other model. During training and optimization of a model, a valid MD range for the input space may be calculated and stored as calibration data associated with individual models. The selected vector, the selected vector's MD value, the remaining vectors of the selected surrounding vectors, and the MD values of the remaining vectors of the selected surrounding vectors may all be stored in a table in memory module 204 or database 206 for further use.

In step 335, computer system 200 may compare the MD of the selected vector to the valid range of the MD values of the surrounding vectors or the valid range for the model from the training and optimization of the model. If the MD value of the selected vector is greater than the valid range, the computer system 200 may next execute step 340. Otherwise, if the MD value of the selected vector is within the valid range, step 310 may be next executed.

In step 340, computer system 200 may have detected the selected vector as an erroneous vector. In one exemplary embodiment, the steps of flowchart 300 may be executed for all vectors in a data set, and relevant information stored or recorded in memory module 204, a database 206, or storage 212 for reuse in later steps of the process. In other exemplary embodiments, each time an erroneous vector is detected, the erroneous vector may be passed to the process of flowchart 400 to detect and delete the erroneous elements of the erroneous vector.

It should be noted that FIG. 3 is exemplary. Depending on circumstances, certain items in flowchart 300 may be omitted, other items may be added, and the order of the indicated items may vary. While FIG. 3 describes using the MD as a distance metric, other distance metrics, such as Euclidian, Chebychev, and Manhattan/city block distances, may be used instead, with some slight modification to the steps of FIG. 3.

Figure 4A:
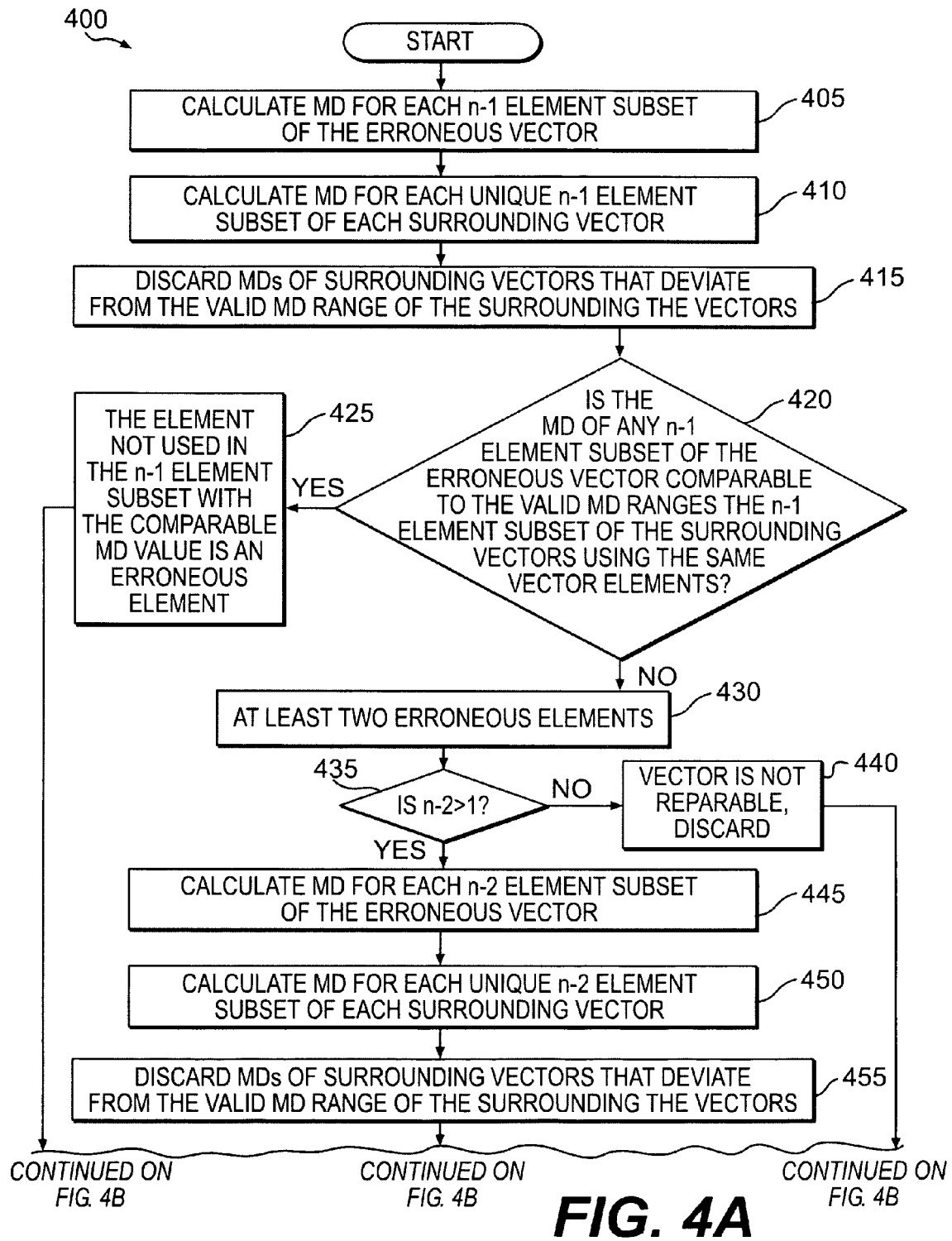
FIGS. 4A and 4B illustrate a flowchart diagram of an exemplary process for the detection of erroneous elements in erroneous vectors in a data set consistent with certain disclosed embodiments.
Figure 4B:
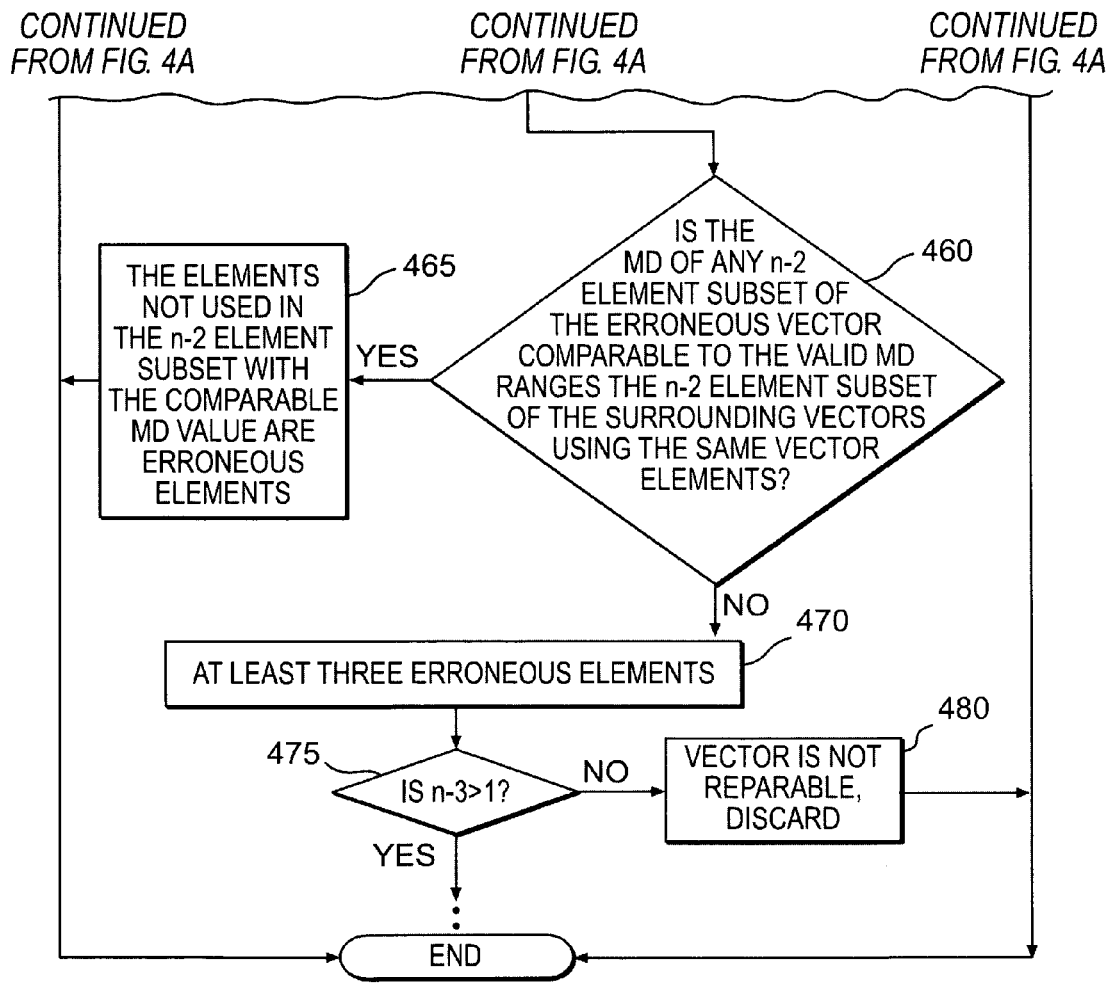

FIGS. 4A and 4B illustrate a flowchart 400 of an exemplary process for the detection of erroneous elements in erroneous vectors in a data set consistent with certain disclosed embodiments. The process of FIGS. 4A and 4B may be performed by computer system 200. For example, computer system 200 may execute one or more software programs that may perform one or more of the process steps of FIGS. 4A and 4B. The process for the detection of erroneous elements in erroneous vectors in a data set may, in the exemplary embodiment, first determine if there is one erroneous element, and if one erroneous element cannot be identified, the process may then determine if there are two erroneous elements, and if two erroneous elements cannot be identified, the process may then determine if there are three erroneous elements, etc. The process may perform a set of repetitive steps to first determine if there is one erroneous element, then determine if there are two erroneous elements, etc.

In step 405, computer system 200 may load from memory module 204, a database 206, or storage 212 the erroneous vector determined in step 340, and any information associated about that erroneous vector, and determine the number of elements in the erroneous vector. The number of elements in the erroneous vector may be called n. A MD value may be calculated for each unique combination of n−1 elements of the erroneous vector. Each unique combination may be called an n−1 subset of the erroneous vector. In one exemplary embodiment, the vectors of the data set of interest may have 10 elements. There may be 9 unique combinations of 9 elements, each a separate subset of the erroneous vector. A MD value may be calculated for each of the 9 subsets of the erroneous vector. The MD values of the unique subsets of the erroneous vector may be stored in a table in memory module 204 or a database 206.

In step 410, computer system 200 may load from memory module 204, a database 206, or storage 212 the selected surrounding vectors used in step 335, and any information associated with those selected surrounding vectors. The selected surrounding vectors may not contain any erroneous vectors. The number of elements of each surrounding vector may be determined, or computer system 200 may use the element number from step 405. In most embodiments, the number of elements may be the same for all vectors in a data set. The number of elements in the selected surrounding vectors may be called n. A MD value may be calculated for each unique combination of n−1 elements of each selected surrounding vector. Each unique combination may be called an n−1 subset of the selected surrounding vector. In some exemplary embodiments, the MD value of one or more of the subsets of the selected surrounding vectors may have been already calculated in a previous step 410, and the MD value for that subset may be reused. In one exemplary embodiment, the vectors of the data set of interest may have 10 elements. There may be 9 unique combinations of 9 elements, each a separate subset of each selected surrounding vector. A MD value may be calculated for each of the 9 subsets of each selected surrounding vector. The MD values of the unique subsets of each selected surrounding vector may be stored in a table in memory module 204 or a database 206.

In step 415, after calculating the MD for each unique subset of each selected surrounding vector, computer system 200 may discard the unique subsets of the selected surrounding vectors with MD values that deviate from the valid MD range of each unique subset of the selected surrounding vector, the discarded vector is only discarded for purposes of use in step 420. In one exemplary embodiment, the valid MD range may be determined from each unique subset of the selected surrounding vector by, for example, the average or mean MD for the subsets in the selected surrounding vectors. In another exemplary embodiment, the valid MD range may have been determined during training and optimizing of a virtual sensor model or other model. During training and optimization of a model, a valid MD range for the input space and/or subsets of the input space may be calculated and stored as calibration data associated with individual models. The unique subset of the selected surrounding vector may be stored in a table in memory module 204 or database 206 for further use.

In step 420, computer system 200 may compare the MD of each unique subset of the elements of the erroneous vector to the valid ranges of the MD values of each unique subset of the selected surrounding vector or the valid range for the model from the training and optimization of the model. The correspondingly-located subsets being compared use the same elements, that is columns, in the vector. For example, if the vector is (X, Y, Z), then the MD value of the subset of the erroneous vector (X, Y) may be compared with the MD values of the subset of the surrounding vectors of (X, Y). If the MD values of the unique subsets of the elements of the erroneous vector are all greater than the valid ranges, the computer system 200 may next execute step 430. If one of the unique subsets of the elements of the erroneous vector is comparable, that is, within range of a valid MD value of a subset of a unique subset of the surrounding vectors, then step 425 may be next executed. In one exemplary embodiment not shown in the process of FIG. 4, if more than one of the unique subsets of the elements of the erroneous vector is comparable, that is, within range of a valid MD value of a subset of a unique subset of the surrounding vectors, an error may have occurred. The erroneous vector and its accompanying data may be flagged for review by an operator, a tighter valid range may be used, and/or step 440 may be next executed.

In step 425, computer system 200 may determine that the element not used in the n−1 element subset with the equivalent or comparable MD value is an erroneous element.

As used herein, comparable or equivalent means within a predetermined range of a value, or within a percentage of a value, such, as for example, 50%. The range in some examples may not be predetermined, but determined during the execution of the processes of flowcharts 300 to 500. In other exemplary embodiments, an MD value one or two higher than the range or average MD value may not be comparable or equivalent. In still further embodiments, the range may be determined based on the standard deviation of one or more vectors.

In step 430, computer system 200 may start a next iteration, where the computer system 200 may be looking for two erroneous elements in the erroneous vector.

In step 435, computer system 200 may determined if the number of elements minus two is greater then one. If (n−2>1), then step 445 is next executed. If (n−2=1), then step 440 is next executed.

In step 440, if (n−2=1), the erroneous vector is not reparable by the process in flowchart 500, and may be discarded. To populate the erroneous elements of an erroneous vector, two elements of the erroneous vector and the inverse covariance matrix of the erroneous vector may be utilized.

In step 445, computer system 200 may calculate a MD value for each unique combination of n−2 elements of the erroneous vector. Each unique combination may be called an n−2 subset of the erroneous vector. In one exemplary embodiment, the vectors of the data set of interest may have 10 elements. There may be 45 unique combinations of 8 elements, each a separate subset of the erroneous vector. A MD value may be calculated for each of the 45 subsets of the erroneous vector. The MD values of the unique subsets of the erroneous vector may be stored in a table in memory module 204 or a database 206.

In step 450, computer system 200 may calculate a MD value for each unique combination of n−2 elements of each selected surrounding vector. Each unique combination may be called an n−2 subset of the selected surrounding vectors. In some exemplary embodiments, the MD value of one or more of the subsets of the selected surrounding vectors may have been already calculated in a previous step 450, and the MD value for that subset may be reused. In one exemplary embodiment, the vectors of the data set of interest may have 10 elements. There may be 45 unique combinations of 8 elements, each a separate subset of each selected surrounding vector. A MD value may be calculated for each of the 45 subsets of each selected surrounding vector. The MD values of the unique subsets of each selected surrounding vector may be stored in a table in memory module 204 or a database 206.

In step 455, after calculating the MD for each unique subset of each selected surrounding vector, computer system 200 may discard the unique subsets with MDs that deviate from the valid MD range of each unique subset of the selected surrounding vectors. The discarded vector is only discarded for purposes of use in step 460. The unique subsets of the selected surrounding vectors may be stored in a table in memory module 204 or database 206 for further use.

In step 460, computer system 200 may compare the MD of each unique subset of the elements of the erroneous vector to the valid ranges of the MD values of each unique subset of the selected surrounding vectors or the valid range for the model from the training and optimization of the model. The correspondingly-located subsets being compared use the same elements, that is columns, in the vector. For example, if the vector is (X, Y, Z), then the MD value of the subset of the erroneous vector (X,Y) may be compared with the MD values of the subset of the surrounding vectors of (X, Y). If the MD value of the unique subsets of the elements of the erroneous vector are all greater than the valid ranges, the computer system 200 may next execute step 470. If one of the unique subsets of the elements of the erroneous vector is comparable, that is, within range of a valid MD value of a subset of a unique subset of the surrounding vectors, then step 465 may be next executed. In one exemplary embodiment not shown in the process of FIG. 4, if more then one of the unique subsets of the elements of the erroneous vector is comparable, that is, within range of a valid MD value of a subset of a unique subset of the surrounding vectors, an error may have occurred. The erroneous vector and its accompanying data may be flagged for review by an operator, a tighter valid range may be used, and/or step 480 may be next executed.

In step 465, computer system 200 may determine that the elements not used in the n−2 element subset with the equivalent or comparable MD value are erroneous elements.

In step 470, computer system 200 may start a next iteration, where the computer system 200 may be looking for three erroneous elements in the erroneous vector.

In step 475, computer system 200 may determine if the number of elements minus three is greater then one. If (n−3>1), then the next step in the repetative process is executed, the same as in step 445, except the unique subsets may be composed of n−3 elements. If (n−3=1), then step 480 may be next executed.

In step 480, if (n−3=1), the erroneous vector is not reparable by the process in flowchart 500, and may be discarded. To populate the erroneous elements of an erroneous vector, two elements of the erroneous vector and the inverse covariance matrix of the erroneous vector may be utilized.

Computer system 200 may continue to execute the process until for every erroneous vector entered, either the erroneous elements of the erroneous vector are determined or the erroneous vector is discarded as irreparable. It should be noted that FIGS. 4A and 4B are exemplary. Depending on circumstances, certain items in flowchart 400 may be omitted, other items may be added, and the order of the indicated items may vary. While FIG. 4 describes using the MD as a distance metric, other distance metrics, such as Euclidian, Chebychev, and Manhattan/city block distances, may be used instead, with some slight modification to the steps of FIG. 4.

Once the processes of FIGS. 3 and 4 have detected the erroneous elements of the erroneous vectors, those elements may be deleted. A deleted element of a vector may have the appearance of a missing element of a vector.

Detecting missing elements in a vector may be done in many ways that are well known in the art. The missing elements may show up as voids, or null values. In some exemplary embodiments, any vector with a void, missing value, or having one or more deleted erroneous elements may be detected. In another exemplary embodiment, if the missing elements are zeros in the vector, a process similar to that of flowcharts 300 and 400 can be used to detect the location in the vector of all missing elements in every vector in a data set.

Figure 5:
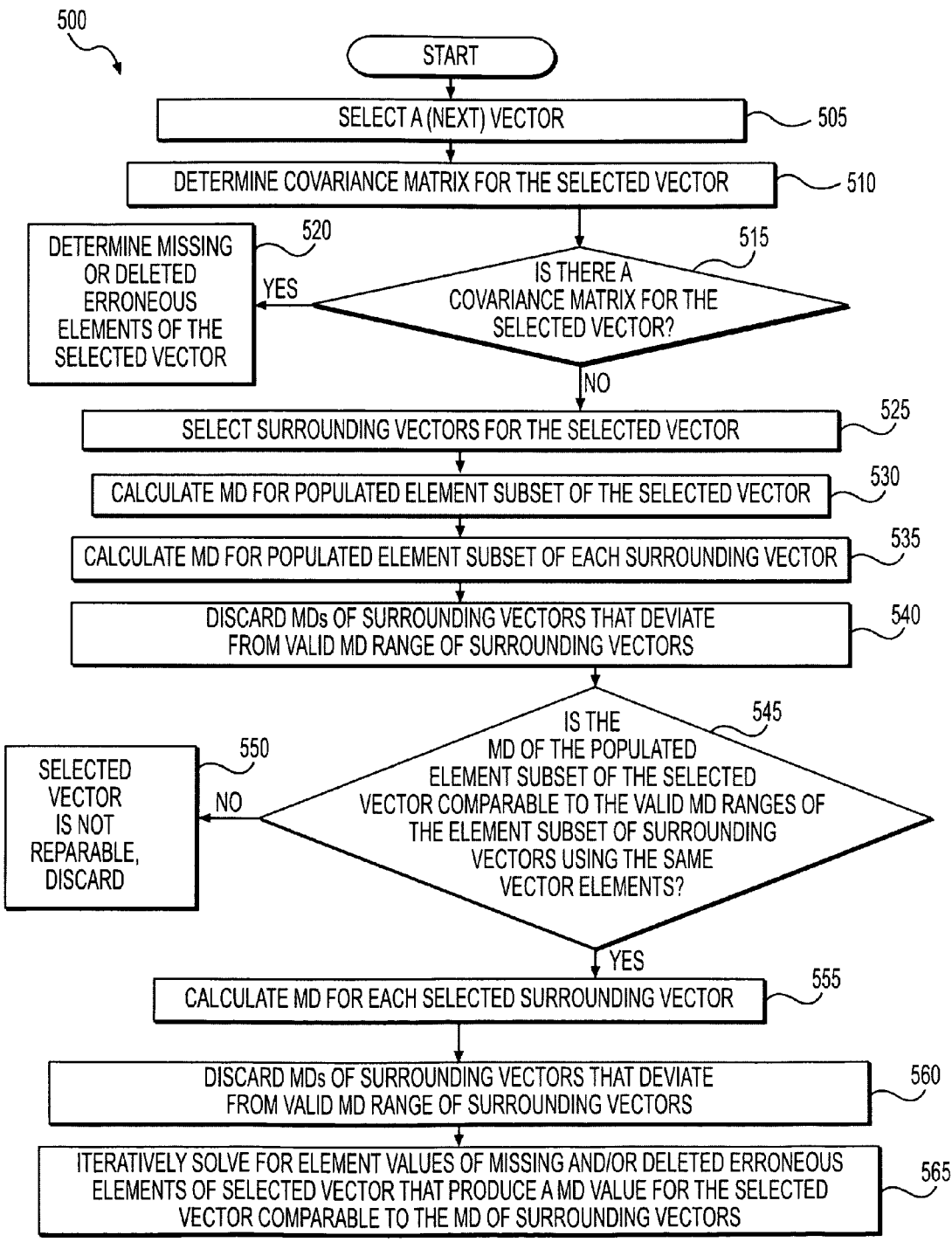
FIG. 5 illustrates a flowchart diagram of an exemplary process for the population of missing and/or deleted erroneous elements in vectors in a data set consistent with certain disclosed embodiments.

FIG. 5 illustrates a flowchart 500 of an exemplary process for the population of elements of vectors with missing and/or deleted erroneous elements in a data set. As used herein, offending vector means a vector with one or more missing elements and/or one or more deleted erroneous elements. The process of FIG. 5 may be performed by computer system 200. For example, computer system 200 may execute one or more software programs that may perform one or more of the process steps of FIG. 5.

In step 505, computer system 200 may select an offending vector. The selected vector may be stored in a table in memory module 204 or database 206.

In step 510, computer system 200 may determine the covariance matrix for the selected vector. In one exemplary embodiment, since the inverse covariance matrix may be used to calculate the MD of the selected vector, the covariance matrix may already have been calculated in a previous process, such as in flowcharts 300 and 400. The covariance matrix may be based on selected surrounding vectors, or based on the training and optimizing of the model.

In step 515, computer system 200 may determine if there is a valid covariance matrix for the selected vector. If the covariance matrix is invalid or of questionable validity, step 525 may be next executed by the process. If the covariance matrix is valid, step 520 may be next executed.

In step 520, computer system 200 may determine the missing and/or deleted erroneous elements of the selected vector using the populated elements of the selected vector and the covariance matrix. Step 520 may provide only one solution for the missing and/or deleted erroneous elements of the selected vector. After completion of step 520, the result may be stored in a table in memory module 204 or database 206, and the process may next execute step 505 for another offending vector, if one is available.

In step 525, computer system 200 may select surrounding vectors for the selected vector. The selected surrounding vectors may not contain any vectors that include a missing element and/or a deleted erroneous element. In one exemplary embodiment, the number of surrounding vectors selected may be one or two. In other exemplary embodiments, the number of surrounding vectors could be hundreds or thousands. The number of selected surrounding vectors may be based on predetermined criteria, based on analysis of the data set, or based on a run-time analysis. In one exemplary embodiment, the surrounding vectors for the selected vector may be the same as the surrounding vectors used in step 315. The selected surrounding vectors may be stored in a table in memory module 204 or database 206.

In step 530, computer system 200 may calculate the MD for the populated element subset of the selected vector. In some exemplary embodiments, the MD value of a subset of the erroneous vector calculated in the process of flowchart 400 may be the same as the MD to be calculated in step 530, and the MD from the process of flowchart 400 may be reused. The MD values for the populated element subset of the selected vector may be stored in a table in memory module 204 or a database 206.

In step 535, computer system 200 may calculate the MD for the populated element subset of selected surrounding vectors with the same elements, that is columns, as the populated element subset of the selected vector. The number and position of the elements in the surrounding vectors of the subset of the surrounding vectors may be the same as the number and position of the elements in the selected vector of the populated elements of the selected vector. In some exemplary embodiments, the MD value of a subset of a surrounding vector calculated in the process of flowchart 400 may be the same as the MD to be calculated in step 535, and the MD from the process of flowchart 400 may be reused. The MD values of the subset of each selected surrounding vector may be stored in a table in memory module 204 or a database 206.

In step 540, after calculating the MD for the populated element subset of selected surrounding vectors, computer system 200 may discard the populated element subsets with MDs that deviate from the valid MD range of the populated element subset of the selected surrounding vectors. The discarded vector is only discarded for purposes of use in step 545. In one exemplary embodiment, the valid MD range may be determined from the populated element subset of the selected surrounding vectors, by, for example, the average or mean MD for the subsets in the selected surrounding vectors. In another exemplary embodiment, the valid MD range may have been determined during training and optimizing of a virtual sensor model or other model. During training and optimization of a model, a valid MD range for the input space and/or subsets of the input space may be calculated and stored as calibration data associated with individual models. The populated element subset of the selected surrounding vectors may be stored in a table in memory module 204 or database 206 for further use.

In step 545, computer system 200 may compare the MD of the populated element subset of the selected vector to the valid ranges of the MD values of the populated element subset of the selected surrounding vectors or the valid range for the model from the training and optimization of the model. The correspondingly-located subsets being compared use the same elements, that is columns, in the vector. For example, if the vector is (X, Y, Z), then the MD value of the subset of the erroneous vector (X, Y) may be compared with the MD values of the subset of the surrounding vectors of (X, Y). If the MD value of the populated element subset of the selected vector is greater than the valid range, computer system 200 may next execute step 550. If the populated element subset of the selected vector is comparable, that is, within range of a valid MD value of the populated element subset of the surrounding vectors, then step 555 may be next executed.

In step 550, because neither a valid covariance matrix nor the MD of the populated element subset of the selected vector is greater than the valid range of the populated element subset of the surrounding vectors, the selected vector may not be populated by the process in flowchart 500, and may be discarded. After completion of step 550, the result may be stored in a table in memory module 204 or database 206, and the process may next execute step 505 for another offending vector, if one is available.

In step 555, computer system 200 may calculate the MD for the selected surrounding vectors. In some exemplary embodiments, the MD value of the selected surrounding vectors calculated in the processes of flowcharts 300 and 400 may be the same as the MD to be calculated in step 555, and the MD from the processes of flowcharts 300 and 400 may be reused. The MD values of the selected surrounding vectors may be stored in a table in memory module 204 or a database 206.

In step 560, after calculating the MD for each selected surrounding vector, computer system 200 may discard the surrounding vectors with MDs that deviate from the valid MD range of the surrounding vectors. The discarded vector is only discarded for purposes of use as a surrounding vector in flowchart 500. The selected vector, the selected vector's MD value, the remaining vectors of the selected surrounding vectors, and the MD values of the remaining vectors of the selected surrounding vectors may all be stored in a table in memory module 204 or database 206 for further use.

In step 565, after discarding deviant surrounding vectors, computer system 200 may iteratively solve for element values of missing and/or deleted erroneous elements of a selected vector that produce a MD value for the selected vector equivalent to the MD of surrounding vectors. The MD values of the surrounding vectors may be derived from an average or medium of surrounding vectors, may be derived from training and optimizing of a model, or may be determined by other means. More then one combination of element values may be calculated that produce a MD value for the selected vector equivalent to the MD of surrounding vectors. After completion of step 565, the result may be stored in a table in memory module 204 or database 206, and the process may next execute step 505 for another offending vector, if one is available.

The process will continue to execute until, for every offending vector, the missing and/or deleted erroneous elements are determined or the selected vector is discarded as irreparable. It should be noted that FIG. 5 is exemplary. Depending on circumstances, certain items in flowchart 500 may be omitted, other items may be added, and the order of the indicated items may vary. For example, in one exemplary embodiment, steps 525 to 565 may be omitted. In another exemplary embodiment, both the forward solution (step 520) and the backward solution (step 525 to 565) may be solved for a selected vector, and the results compared as a consistency check. While FIG. 5 describes using the MD as a distance metric, other distance metrics, such as Euclidian, Chebychev, and Manhattan/city block distances, may be used instead, with some slight modification to the steps of FIG. 5.

INDUSTRIAL APPLICABILITY

The disclosed mathematical modeling method and system may provide a desired solution for populating a vector with missing or erroneous elements, which may be difficult or impractical to achieve by other conventional methods and systems. The disclosed methods and systems may be used to create more accurate models by filling voids created by missing data for virtual sensing. The voids may be filled by calculating a distance metric, such as the Mahalanobis Distance (MD), of the vector that includes a missing element and/or a deleted erroneous element using the remaining variables and comparing it to other vectors of comparable MD value. The other vectors contain the data missing from the first vector, so the missing values may either be populated from their estimates (mean, mode) or, preferably, by using the MD covariance matrix to calculate the most likely missing value from the values specified in the populated sections of the vector.

For erroneous data detection, offending vectors fail to follow the covariance structure in the MD calculation, so their MD value will be greater than the surrounding vectors. The erroneous elements can be detected by repetitively searching the MD value of subset vectors (leaving out one or more variables) and comparing the values to other subset MDs for vectors near the offending record's position in time. By observing the MD checks of the sub-vectors, the erroneous data value can be found. Once found, it can be deleted and handled as a missing data point by the first part of the process (which will fill it back in correctly based on the MD expectation). Performance of other statistical or artificial intelligence modeling tools may be significantly improved when incorporating the disclosed methods and systems.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope of the disclosure being indicated by the following claims.

What is claimed is:

1. A computer-implemented method for pre-processing data, comprising:
  detecting one or more erroneous vectors in a plurality of vectors;
  detecting one or more erroneous elements in the one or more erroneous vectors;
  deleting values of the one or more detected erroneous elements from the one or more erroneous vectors;
  identifying one or more surrounding vectors surrounding the one or more erroneous vectors with respect to time;
  determining a surrounding vector distance metric based on one or more elements of the one or more surrounding vectors corresponding to the one or more erroneous elements of the one or more erroneous vectors;
  calculating one or more new values for the one or more erroneous elements such that an erroneous vector distance metric, determined based on at least one or more remaining values of the one or more erroneous vectors, corresponds to the surrounding vector distance metric; and replacing the deleted values of the one or more erroneous elements with the calculated one or more new values for the one or more erroneous elements of the one or more erroneous vectors.

2. The computer-implemented method according to claim 1, wherein the distance metric is a Mahalanobis Distance.

3. The computer-implemented method according to claim 2, wherein detecting one or more erroneous vectors in the plurality of vectors includes calculating a Mahalanobis Distance for each of the plurality of vectors to detect vectors with a Mahalanobis Distance greater by a predetermined threshold than that of the one or more surrounding vectors in time.

4. The computer-implemented method according to claim 2, wherein detecting one or more erroneous elements in the one or more erroneous vectors includes calculating a Mahalanobis Distance value for each subset of elements of the one or more erroneous vectors, and comparing the calculated Mahalanobis Distance value for each subset of elements of the one or more erroneous vectors with Mahalanobis Distance values calculated for a plurality of correspondingly-located subsets of elements of the one or more surrounding vectors in time.

5. The computer-implemented method according to claim 4, wherein detecting one or more erroneous elements in the one or more erroneous vectors further includes determining whether a Mahalanobis Distance value of each subset of elements of the one or more erroneous vectors is comparable to a Mahalanobis Distance value of the correspondingly-located subsets of elements of the one or more surrounding vectors.

6. The computer-implemented method according to claim 2, wherein calculating one or more new values for the one or more erroneous elements of the one or more erroneous vectors includes using a covariance matrix for the one or more erroneous vectors.

7. The computer-implemented method according to claim 2, wherein calculating one or more new values for the one or more erroneous elements includes calculating a Mahalanobis Distance of the one or more erroneous vectors using a populated element subset of the one or more erroneous vectors and comparing the calculated Mahalanobis Distance of the populated element subset of the one or more erroneous vectors to one or more of the surrounding vectors with elements that have a comparable Mahalanobis Distance value.

8. The computer-implemented method according to claim 7, wherein calculating one or more new values for the one or more erroneous elements further includes:

calculating the Mahalanobis Distance of the one or more surrounding vectors which have elements with a comparable Mahalanobis Distance value to the populated element subset of the one or more erroneous vectors; and using the calculated Mahalanobis Distance for the one or more surrounding vectors to calculate the new values for the one or more erroneous elements of the one or more erroneous vectors that would give a Mahalanobis Distance value for the one or more erroneous vectors comparable to the Mahalanobis Distance of the one or more surrounding vectors.

9. A non-transitory computer-readable medium for use on a computer system configured to perform pre-processing of data, the non-transitory computer-readable medium having computer-executable instructions for performing a method comprising:

detecting one or more erroneous vectors in a plurality of vectors;

detecting one or more erroneous elements in the one or more erroneous vectors; deleting values of the one or more detected erroneous elements from the one or more erroneous vectors; identifying one or more surrounding vectors surrounding the one or more erroneous vectors with respect to time;

determining a surrounding vector distance metric based on one or more elements of the one or more surrounding vectors corresponding to the one or more erroneous elements of the one or more erroneous vectors;

calculating one or more new values for the one or more erroneous elements such that an erroneous vector distance metric, determined based on at least one or more remaining values of the one or more erroneous vectors, corresponds to the surrounding vector distance metric; and replacing the deleted values of the one or more erroneous elements with the calculated one or more new values for the one or more erroneous elements of the one or more erroneous vectors.

10. The non-transitory computer-readable medium according to claim 9, wherein the distance metric is a Mahalanobis Distance.

11. The non-transitory computer-readable medium according to claim 10, wherein detecting one or more erroneous vectors in the plurality of vectors includes calculating a Mahalanobis Distance for each of the plurality of vectors to detect vectors with a Mahalanobis Distance greater by a predetermined threshold than that of the one or more surrounding vectors in time.

12. The non-transitory computer-readable medium according to claim 10, wherein detecting one or more erroneous elements in the one or more erroneous vectors includes calculating a Mahalanobis Distance value for each subset of elements of the one or more erroneous vectors, and comparing the calculated Mahalanobis Distance value for each subset of elements of the one or more erroneous vectors with Mahalanobis Distance values calculated for a plurality of correspondingly-located subsets of elements of the one or more surrounding vectors in time.

13. The non-transitory computer-readable medium according to claim 12, wherein detecting one or more erroneous elements in the one or more erroneous vectors further includes determining whether a Mahalanobis Distance value of each subset of elements of the one or more erroneous vectors is comparable to a Mahalanobis Distance value of the correspondingly-located subsets of elements of the one or more surrounding vectors.

14. The non-transitory computer-readable medium according to claim 10, wherein calculating one or more new values for the one or more erroneous elements of the one or more erroneous vectors includes using a covariance matrix for the one or more erroneous vectors.

15. The non-transitory computer-readable medium according to claim 10, wherein calculating one or more new values for the one or more erroneous elements includes calculating a Mahalanobis Distance of the one or more erroneous vectors using a populated element subset of the one or more erroneous vectors and comparing the calculated Mahalanobis Distance of the populated element subset of the one or more erroneous vectors to one or more of the surrounding vectors with elements that have a comparable Mahalanobis Distance value.

16. The non-transitory computer-readable medium according to claim 15, wherein calculating one or more new values for the one or more erroneous elements further includes:
- calculating the Mahalanobis Distance of the one or more surrounding vectors which have elements with a comparable Mahalanobis Distance value to the populated element subset of the one or more erroneous vectors; and
- using the calculated Mahalanobis Distance for the one or more surrounding vectors to calculate the new values for the one or more erroneous elements of the one or more erroneous vectors that would give a Mahalanobis Distance value for the one or more erroneous vectors comparable to the Mahalanobis Distance of the one or more surrounding vectors.

17. A computer system, comprising:
- at least one input/output interface;
- a database configured to store information relevant to a virtual sensor process model; and
- a processor configured to:
  - obtain a set of data records corresponding to a plurality of vectors;
  - detect one or more erroneous vectors in the plurality of vectors;
  - detect one or more erroneous elements in the one or more erroneous vectors;
  - delete values of the detected one or more erroneous elements from the one or more erroneous vectors;
  - identify one or more surrounding vectors surrounding the one or more erroneous vectors with respect to time;
  - determine a surrounding vector distance metric based on one or more elements of the one or more surrounding vectors corresponding to the one or more erroneous elements of the one or more erroneous vectors;
  - calculate one or more new values for the one or more erroneous elements such that an erroneous vector distance metric, determined based on at least one or more remaining values of the one or more erroneous vectors, corresponds to the surrounding vector distance metric;
  - replace the deleted values of the one or more erroneous elements with the calculated one or more new values for the one or more erroneous elements of the one or more erroneous vectors.

18. The computer system according to claim 17, wherein, to detect one or more erroneous vectors in a plurality of vectors, the processor is configured to calculate a Mahalanobis Distance for each of the plurality of vectors to detect vectors with a Mahalanobis Distance greater by a predetermined threshold than that of surrounding vectors in time.

19. The computer system according to claim 17, wherein, to calculate one or more new values for the one or more erroneous elements, the processor is configured to use a covariance matrix for the one or more erroneous vectors.

20. The computer system according to claim 17, wherein, to calculate one or more new values for the one or more erroneous elements, the processor is configured to calculate a Mahalanobis Distance of the one or more erroneous vectors using a populated element subset of the one or more erroneous vectors and compare the calculated Mahalanobis Distance of the populated element subset of the one or more erroneous vectors to one or more of the surrounding vectors with elements which have a comparable Mahalanobis Distance value.

21. The computer system according to claim 17, wherein, to calculate one or more new values for the one or more erroneous vectors, the processor is further configured to:
- calculate the Mahalanobis Distance of the one or more surrounding vectors which have elements with a comparable Mahalanobis Distance value to the populated element subset of the one or more erroneous vectors; and
- use the calculated Mahalanobis Distance for the one or more surrounding vectors to calculate the one or more new values for the elements of the one or more erroneous vectors that would give a Mahalanobis Distance value for the one or more erroneous vectors comparable to the calculated Mahalanobis Distance of the one or more surrounding vectors.

* * * * *